US011993414B2

(12) United States Patent
Dibble et al.

(10) Patent No.: US 11,993,414 B2
(45) Date of Patent: May 28, 2024

(54) CLEANING, FILLING, AND CAPPING CONTAINERS

(71) Applicant: Boomerang Water, LLC, Cornelius, NC (US)

(72) Inventors: Jason Dibble, Cornelius, NC (US); Marc Haydt, Lehighton, PA (US); Zach Hilton, Belmont, NC (US)

(73) Assignee: Boomerang Water, LLC, Davidson, NC (US)

( * ) Notice: Subject to any disclaimer, the term of this patent is extended or adjusted under 35 U.S.C. 154(b) by 173 days.

(21) Appl. No.: 17/549,134

(22) Filed: Dec. 13, 2021

(65) Prior Publication Data

US 2023/0182937 A1 Jun. 15, 2023

(51) Int. Cl.
*B65B 7/28* (2006.01)
*B67C 3/26* (2006.01)
*B67C 7/00* (2006.01)

(52) U.S. Cl.
CPC .......... *B65B 7/2835* (2013.01); *B67C 3/2642* (2013.01); *B67C 7/004* (2013.01); *B67C 2007/006* (2013.01); *B67C 2007/0066* (2013.01)

(58) Field of Classification Search
CPC ..... B65B 7/2835; B67C 3/2642; B67C 7/004; B67C 2007/006; B67C 2007/0066
See application file for complete search history.

(56) References Cited

U.S. PATENT DOCUMENTS

| | | | | |
|---|---|---|---|---|
| 3,352,629 | A * | 11/1967 | Iverson | B65B 55/10 221/222 |
| 3,945,411 | A * | 3/1976 | Skoli | B67C 3/001 134/169 C |
| 4,573,505 | A | 3/1986 | Lee et al. | |
| 4,608,806 | A * | 9/1986 | Haslam | B67B 3/2046 53/317 |
| 6,647,204 | B1 * | 11/2003 | Hutchinson | A47L 11/4088 392/491 |
| 7,980,046 | B2 | 7/2011 | Yousefpour et al. | |
| 8,356,461 | B2 * | 1/2013 | Cedrone | B67C 7/00 53/484 |
| 11,634,242 | B1 | 4/2023 | Dibbie et al. | |

FOREIGN PATENT DOCUMENTS

| | | |
|---|---|---|
| EP | 479010 | 4/1992 |
| GB | 407672 | 3/1934 |
| WO | WO 2003051760 | 6/2003 |
| WO | WO 2011059514 | 5/2011 |
| WO | WO 2012092394 | 7/2012 |

* cited by examiner

*Primary Examiner* — Jacob A Smith
(74) *Attorney, Agent, or Firm* — Fish & Richardson P.C.

(57) ABSTRACT

Systems and methods for filling and sealing a container can include a housing having an opening for receiving containers, a rotary assembly including mount assemblies disposed in the housing, the rotary assembly operable to rotate the of mount assemblies about a central axis, a washing station, a filling station, a steam injector, and cap setter disposed in the housing.

14 Claims, 11 Drawing Sheets

CLEANING, FILLING, AND CAPPING CONTAINERS

TECHNICAL FIELD

This disclosure relates generally to systems and methods for cleaning, filling, and sealing of containers.

BACKGROUND

Consumable liquids (e.g., water, soda, and juice) are commonly packaged in individual containers, such as glass or plastic bottles. The filling and capping of such containers typically takes place on a large industrial scale. For example, a large conveyor advances containers through various stages of the packaging process (e.g., filling and capping the containers).

SUMMARY

This specification describes methods and systems for cleaning, filling, and capping of containers. These methods and systems enable the reuse of individual containers to reduce the amount of waste generated from discarding used containers.

This approach uses a portable system in which stations for cleaning, filling, and sealing containers are mounted in a housing. A rotary assembly disposed in the housing includes multiple mount assemblies and is operable to rotate the mount assemblies around a central axis of the rotary assembly. Each mount assembly is configured to hold a set of the containers (e.g., bottles). The housing also contains a washing station, a filling station, a steam injector, and a sealing station. The steam injector includes an inline steam generator operable to heat water to steam. Discharge piping transfers steam from the inline steam generator to each container at the sealing station.

The system is used for close-looped bottling of water at industrial, corporate and hospitality campuses (e.g., manufacturing plants, mining camps, cruise ships, corporate campuses, hotels and resorts). It can be installed on site and operated by personnel to provide bottled water to the facility (e.g., customers/employees). This can reduce/remove single-use plastics, reduce cost per bottle of water, and encourage local sourcing of drinking water. The system can also be retrofitted to fill/refill other bottled liquids such as soaps, shampoos, etc. for the hospitality industry to reduce waste in hotels and resorts. Systems can also be set up as local bottling facilities for commercial use in a franchise. Locally sourced water would be bottled and distributed while the bottles would be returned and reused.

For example, systems can be used at resorts, coal mines, and a company-owned franchises. The mines can bottle water in aluminum bottles and palletize it, then send the bottled water into the mines with the miners. This can reduce/remove plastic waste within the mines and on-site. Resorts can use the system to fill glass and aluminum bottles for both room service and activity service. This approach enables resorts to in-house brand their water and to reduce waste and cost of the bottled water for their facility.

In some implementations, apparatus for filling and sealing a container include: a portable housing having an opening for receiving containers; a rotary assembly disposed in the housing, the rotary assembly comprising a plurality of mount assemblies, each mount assembly configured to hold a set of the containers, the rotary assembly operable to rotate the plurality of mount assemblies about a central axis of the rotary assembly; a washing station disposed in the housing; a filling station disposed in the housing; a steam injector disposed in the housing, and a capping station disposed in the housing. The capping station can include a cap setter with a bar with an engagement surface positioned to engage caps on each container of the set of the containers of the mount assembly aligned with the steam injector such that each cap is pressed radially towards an associated container of the set of the containers of the mount assembly aligned with the steam injector. The steam injector can include: an inline steam generator operable to heat water to steam; and discharge piping coupled to the inline steam generator to receive steam from the inline steam generator and configured to inject equal amounts of steam onto each cap of a set of caps as a set of containers of a mount assembly approaches or is aligned with the steam injector.

In some implementations, a cap setter for capping a container includes: a bar with an engagement surface having a constant radius, the engagement surface positioned to engage caps on each container of a set of the containers such that the caps are pressed radially towards an associated container of the set of the containers, wherein the cap setter comprises an inclined edge along the bar; and wherein the cap setter comprises linear actuators operable to adjust a distance of the bar from the central axis of the rotary assembly, wherein the linear actuators are connected to a passive limit switch that detects whether a detected container includes two caps and prevents double capping by detecting two signals when the detected container does not include any cap, one signal when the detected container includes a single cap, and zero signals when the detected container includes two caps, and the switch controls the linear actuators so that the linear actuators adjust the distance of the bar when the switch detects that the detected container includes two caps.

In some implementations, apparatus for filling and sealing a container include: a portable housing having an opening for receiving containers; a rotary assembly disposed in the housing, the rotary assembly comprising a plurality of mount assemblies, each mount assembly configured to hold a set of the containers, the rotary assembly operable to rotate the plurality of mount assemblies about a central axis of the rotary assembly; a washing station disposed in the housing; a filling station disposed in the housing; a steam injector disposed in the housing; a capping station disposed in the housing; and a water heating system disposed in the housing. The water heating system can include: an immersion heater installed directly into a hot water holding tank, and a distribution manifold having a lower thermal conductivity than the water heater, the manifold being external to the hot water holding tank. The capping station can include a cap setter with a bar with an engagement surface positioned to engage caps on each container of the set of the containers of the mount assembly aligned with the steam injector such that each cap is pressed radially towards an associated container of the set of the containers of the mount assembly aligned with the steam injector. The steam injector can include: an inline steam generator operable to heat water to steam; and discharge piping coupled to the inline steam generator to receive steam from the inline steam generator and configured to inject equal amounts of steam onto each cap of a set of caps as a set of containers of a mount assembly approaches or is aligned with the steam injector.

Embodiments of these systems and devices can include one or more of the following features.

In some embodiments, the washing station comprises multiple washing stations disposed in the housing.

In some embodiments, the distance between the engagement surface of the bar of the cap setter and the central axis of the rotary assembly is constant along the length of the engagement surface. In some cases, the bar is fixed in position relative to the central axis of the rotary assembly during operation of the apparatus. In some cases, the cap setter comprises linear actuators operable to adjust a distance of the bar from the central axis of the rotary assembly. The linear actuators can be connected to a switch that detects whether a detected container includes a sealed cap and a second cap, and the switch controls the linear actuators so that the linear actuators adjust the distance of the bar and prevent the engagement surface from engaging the caps when the switch detects that the detected container is connected to the detected cap. The switch can be a passive limit switch that prevents double capping by detecting two signals when the detected container does not include the second cap or the sealed cap, one signal when the detected container includes a single cap, and zero signals when the detected container is connected to a sealed cap and a second cap. The cap setter can include an inclined edge along the bar.

In some embodiments, the steam injector comprises a manifold with a plurality of dispensing ports. In some cases, the steam injector is configured to provide an equal pressure drop across the plurality of dispensing ports. In some cases, the plurality of dispensing ports comprises a plurality of nozzles. In some cases, the plurality of dispensing ports have different orifice diameters to maintain an equal pressure drop across the plurality of dispensing ports. The orifice diameter of the dispensing port closest to the steam generator can be smaller than the orifice diameters of the other dispensing ports and the orifice diameters of the other dispensing ports can increase with distance from the inline steam generator.

In some cases, the steam injector comprises valves to provide an equal pressure drop across the plurality of dispensing ports. In some cases, a maximum pressure provided by the inline steam generator is less than 15 psi. In some cases, the inline steam generator is operable to provide a steam temperature of between 230° F. and 260° F.

In some embodiments, implementations also include a user interface on the exterior of the housing. In some cases, the user interface comprises a display that displays system data. The system data can include total cycles run on the machine after installation. In some cases, the user interface allows for individual control of each of the washing station, filling station, steam injector, capping station, and water heating system.

In some implementations, methods for filling and sealing a container include: sanitizing the container at a washing station; filling the container at a filling station; injecting equal amounts of steam with a steam injector onto each cap of a set of caps the container approaches or is aligned with the steam injector, wherein the steam injector comprises discharge piping coupled to an inline steam generator to receive steam from the inline steam generator; and engaging a cap on the container aligned with the steam injector and a capping station, such that the cap is pressed radially towards the container aligned with the steam injector and capping station, wherein the capping station comprises a cap setter comprising a bar with an engagement surface. Embodiments of the methods can include one or more of the following features.

In some cases, methods also include rotating a rotary assembly, which holds the container, wherein a rotation of the rotary assembly brings the container to the washing station, filling station, steam injector, and capping station.

In some cases, the rotation of the rotary assembly is paused for 1.5 seconds during the injection of steam by the steam injector.

The systems and methods described in the specification provide an apparatus with a small footprint for filling containers. The apparatus is suitable for small-scale production of filled containers (e.g., bottles filled with potable water). The apparatus is portable and readily transportable between various locations requiring only limited facility infrastructure. A 100-amp single-phase service, network connection, and approved water source are all that is required for installation of the system. Providing an apparatus capable of cleaning, filling, and sealing used containers allows the containers to be reused, reducing the amount of waste generated from discarding used containers. In particular, these systems and methods can provide a way to displace single-use plastic water bottles in appropriate settings. This approach includes installing and operating the systems in closed-loop environments where bottles can be filled, used, returned, and repeated in a complete cycle.

Utilizing locally sourced water and reusable bottles that are made of sustainable substrate (e.g., aluminum or glass, which are both 100% recyclable as opposed to plastic) results in massively reduced transportation costs and carbon footprint for bottled water, a higher quality product (i.e., reduced plastic leaching and stale product that can result from being packaged and transported for months over thousands of miles in plastic), and reduced waste management and recycling costs (e.g., by elimination of single use plastic waste into the environment). Additionally, the system only requires one operator to serve thousands of bottles per day per system.

Other implementations are within the scope of the claims.

DETAILED DESCRIPTION

This specification describes methods and systems for cleaning, filling, and capping of containers. This approach uses a portable system in which stations for cleaning, filling, and sealing containers are mounted in a housing, for example, a housing mounted on wheels. A rotary assembly disposed in the housing includes multiple mount assemblies and is operable to rotate the mount assemblies around a central axis of the rotary assembly. Each mount assembly is configured to hold a set of the containers. The housing also contains a washing station, a filling station, a steam injector, and a sealing station. The steam injector includes an inline steam generator operable to heat water to steam. Discharge piping transfers steam from the inline steam generator to each container at the sealing station.

Figure 1:
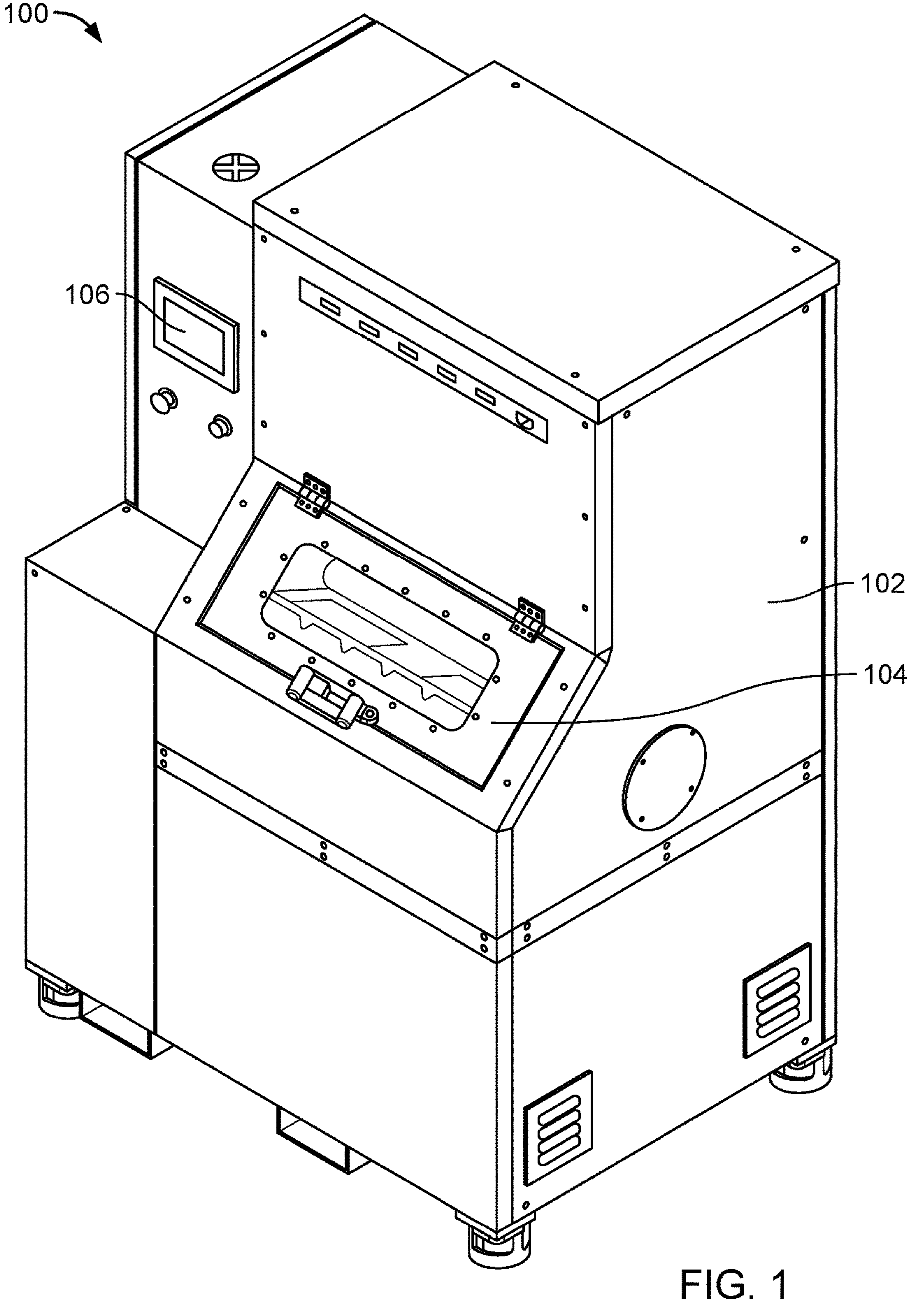
FIG. 1 is a perspective view of an apparatus for cleaning, filling, and sealing containers.

FIG. 1 is a perspective view of a system 100 for cleaning, filling, and sealing containers. Although the illustrated system is configured for cleaning, filling, and sealing bottles with potable water, other systems are configured cleaning, filling, and sealing other containers (e.g., cartons or jugs) with water or other liquids (e.g., soaps or shampoos). Soaps, shampoos, flavored beverages, and other liquids typically provided in small single-use plastic containers could be filled using the system with minimal changes. Some changes required would include adding a metering pump for transportation of the target liquids, changing the existing dispensing manifold to accommodate a change in viscosity and volume, and changing of the bottle holder.

The system 100 includes a housing 102 which contains a rotary assembly. The housing 102 has an opening for receiving bottles or containers. In the system 100, the opening is a rotary assembly door 104 through which empty containers are inserted and filled containers are removed. The housing 102 also includes openings providing ready access to other stations (e.g., the cleaning, filling, and capping stations) within the housing 102. A user interface 106 mounted on the housing 102 displays information about the system 100 and allows a user to control operations of the system 100. Although the user interface 106 is based on a touchscreen display, some user interfaces, alternatively or additionally, include other input/output devices (e.g., a monitor and keyboard). The user interface 106 displays information such as operations occurring within the housing 102, error prompts to the operator, and technical information about the system.

The system 100 is configured to be portable. It is self-contained with the components needed to clean, fill, and seal containers disposed inside the housing 102. The system 100 sized to be easily transported between locations and mounted on wheels. Prototype systems are approximately 900 pounds with dimensions at 48 inches by 35 inches by 72 inches. The units are readily transported between sites and moved between various locations at a site. This approach enables use of these systems at locations such as industrial sites, manufacturing facilities, corporate campuses, resorts hotels, military bases, and commercial distribution of bottled water in retail facilities.

Figure 2:
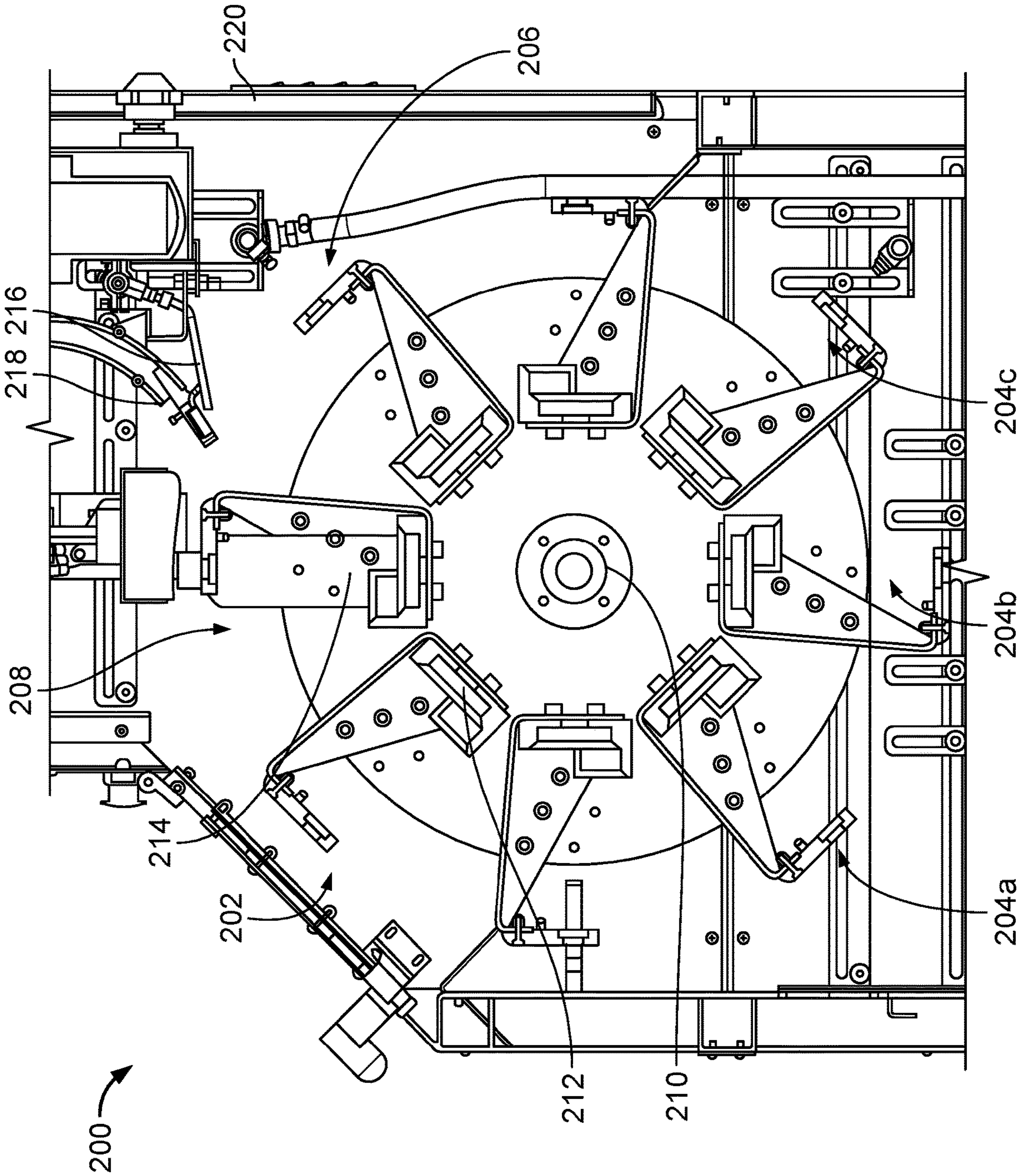
FIG. 2 is a cutaway side view of a portion of the apparatus of FIG. 1.

FIG. 2 is a cutaway side view of a portion of the system 100 that shows an operator station 202, three washing stations 204, a filling station 206, and a capping station 208 inside the housing 102. A rotary assembly 210 with eight mount assemblies 212 is mounted in the housing 102. The rotary assembly 210 is operable to rotate the mount assemblies about a central axis of the rotary assembly 210.

Although the high number of mount assemblies 212 increases the number of components and complexity of the system 100, the mount assemblies 212 cooperate with the single capping station 208 and the three washing stations 204 to reduce the overall cycle time while keeping capped bottles at the capping station 208 for an appropriate period of time to allow sealing foam in the caps to set while also providing sufficient total time at the washing stations 204 to achieve the sterilization required for potable water and other food-grade bottling systems. Some systems are configured with other numbers (e.g., six or ten) of mounting assemblies for other applications. Although each mount assembly is configured to hold six bottles 214, some mount assemblies are configured to hold other numbers or types of containers. The system can accommodate for most standard personal single-use sizes of containers (e.g., glass or aluminum containers). The primary modification required to accommodate for different sizes of containers would be to either adjust the container mount base for height adjustment or the replacement of the container holder in which the container is held. For example, the mount assemblies are removable even after the system has been assembled and can be replaced according to new container geometries and sizes. New cap dispensers may also need to be installed to account for different dimensions of the container mouths.

In operation, rotation of the rotary assembly 210 brings the six bottles 214 in the mount assembly 212 to the operator station 202, the three washing stations 204, the filling station 206, and the capping station 208. The system 100 is equipped to run each station (i.e., the three washing stations 204, the filling station 206, and the capping station 208) simultaneously. For example, the rotary assembly 210 has enough mount assemblies 212 to hold a set of bottles 214 at each station. The system 100 includes a steam injector 216 and a cap dispenser 218 between the filling station 206 and the capping station 208. During a process cycle, the system 100 receives a set of bottles 214 through the operator station 202, sanitizes the containers 214 at the three washing stations 204, fills the bottles 214 at the filling station 206, provides a cap for the bottles 214 from the cap dispenser 218, injects the bottles 214 with steam from the steam injector 216, and seals the cap to the containers 214 at the capping station 208.

The operator station 202 allows an operator to insert containers (e.g., bottles) 214 into the system 100, remove bottles 214 from the system 100, and access the interior of the system 100. The operator station 202 also allows an operator to view the operation of the system 100. In some automated systems, another machine inserts bottles 214 into the system 100 and remove bottles 214 from the system 100 at the operator station 202 rather than having an operator perform this function manually.

Washing stations clean the containers prior to filling and capping. Each washing station includes dispensing device(s) applying a liquid cleaning solution (e.g., hot water and/or a sanitizer) against portions of the bottles 214. The system 100 has three washing stations 204*a*, 204*b*, 204*c*. At the first washing station 204*a*, a nozzle sprays water heated to at least 180° F. with the potential to incorporate cleaning solutions into the bottles 214. For example, different types of nozzles can be selected depending on size/dimensions of a bottle and efficient spray patterns. These are typically different for each application. At the second and third washing stations, water heated to at least 180° F. are sprayed into the bottles for rinsing and for sanitization of the bottles. Conduits inside the housing hydraulically connect each of the washing stations to the water supply inlet of the system 100. Washing water in the system can be recycled, e.g., 4-8 times when using the system for full bottle cleaning. Filtration can be used for removing particulates and contamination in wash water. In some embodiments, a visual indicator of wash-side water quality can provide the operator the ability to determine if an early flush is required. Although the system 100 has three washing stations 204*a*, 204*b*, 204*c*, some systems have other numbers of washing stations (e.g., 1, 2, or 4 stations). For example, fewer stations are used when a commercial dishwasher is used for cleaning. When using a standalone dishwasher, only two stations are be used for rinsing and sanitizing.

During the washing operation, the bottles 214 are positioned with their openings downwards so that the cleaning solution can drain from the bottles 214. In the system 100, the bottles 214 are oriented at 45° from vertical at the first and third washing stations 204*a*, 204*c* and are oriented vertically at the second washing station 204*b*. Some systems 100 include air dispensing devices (e.g., nozzles) to expedite the removal of cleaning solution from the bottles 214.

The filling station 206 operates to dispense a liquid (e.g., water or soda) into the container. The filling station 206 includes filling devices (e.g., sprayers or nozzles) for dispensing liquid into the bottles 214. In the system 100, the filling devices are fixed to the housing 102 of the apparatus. In some systems, the filling devices are secured to an arm or arms operable to move the filling device between various positions relative to the rotary assembly. Some systems include a filter (e.g., a sub-micron paper filter or a charcoal filter) between the liquid supply to remove impurities from the liquid and/or an ultraviolet radiation source within the housing 102 to kill pathogens in the liquid. The filling station 206 may also include a device for inserting additives (e.g., vitamins, minerals, or flavorings) into the liquid.

The steam injector 216 and the cap dispenser 218 (e.g., a set of cap sleeves aligned with each container in a set of containers in a bottle mount assembly) are positioned between the filling station 206 and the capping station 208. The cap dispenser 218 dispenses caps and positions the caps over the openings of the set of bottles 214. The cap dispenser 218 includes a heating element that heats the cap to soften a material (e.g., plastic) that forms at least a part of the cap. For example, the cap may have a metallic exterior portion and a plastic or rubber interior portion which can soften. A prototype system uses 40 millimeter closures that have been pre-dosed with a food-grade sealing foam. The foam is designed to take a set when enough heat or pressure has been applied. Compressing the caps around a formed thread feature on the bottles creates a water-tight seal once the caps are set.

Alternatively or additionally, the cap dispenser 218 can be sprayed with steam from the steam injector 216 to heat the cap. As the set of bottles 214 approaches the steam injector 216 and cap dispenser 218, or slightly before (e.g., 0.5 seconds before) the set of bottles 214 approaches the steam injector 216 and cap dispenser 218, the steam injector 216 sprays the cap dispenser 218 with steam to heat the caps and to provide a sufficient amount of steam to seal the caps to the set of bottles 214. For example, the steam sprayed at the cap dispenser 218 is trapped inside the caps and creates a vacuum seal when the bottles 214 are sealed at the capping station 206 and the steam cools. In another example, additional steam is sprayed into the bottles 214 as the bottles 214 approach the steam injector 216, and the additional steam is trapped inside the bottle 214 and creates a vacuum seal when the bottles 214 are sealed at the capping station 208. The rotary assembly 210 can pause its rotation (e.g., for about 1.5 seconds) while a set of bottles is aligned with the steam injector 216 and while the steam injector 216 is operating. The steam injector includes discharge piping coupled to an inline steam generator to receive steam from the inline steam generator. The discharge piping is configured to inject equal amounts of steam onto each cap of a set of caps as a set of containers of a mount assembly approaches or is aligned with the steam injector.

After the bottles 214 are injected with steam and provided with caps, they are sealed. The rotary assembly 210 rotates to bring the set of bottles 214 to the capping station 208. The capping station 208 includes a cap setter 220 (e.g., a roller, a bar, a press), which presses the caps onto the bottles 214 until they are sealed to the bottles 214. For example, the steam injected into the bottles 214 can create a vacuum seal to seal the caps to the bottles 214. The caps can also be provided with a food-grade sealing agent to seal the caps to the bottles 214.

After the bottles 214 are sealed at the capping station 208, they are removed from the housing 102. The rotary assembly rotates to bring the set of bottles 214 to the operator station 202. The operator station 202 can allow an operator to remove the set of bottles 214 from the housing 102. In another example, another machine (e.g., an automated loading/unloading system) removes bottles 214 from the housing 102. After a set of bottles 214 are removed, the operator (or machine) can replace them with a new set of bottles to be washed, filled, and capped.

Some or all of the stations (e.g., the operating station 202, the washing stations 204, the filling station 206, the steam injector 216 and cap dispenser 218, the capping station 208) can run simultaneously. For example, the rotary assembly 210 has a number of mount assemblies 212 sufficient to hold a set of bottles 214 at each station at the same time, and each station can run simultaneously, reducing processing time. In embodiments where bottles 214 are inserted and removed from the housing 102 automatically (e.g., by an automated machine), the process time at each station can be a predetermined amount of time (e.g., 20 seconds), and the rotary assembly 210 can automatically rotate to bring the sets of containers to the next station after the predetermined amount of time. In other embodiments, the process time can be monitored and determined by an operator. For example, the operator of the apparatus can control the apparatus to rotate the rotary assembly 210 and bring each set of bottles 214 to the next station when the operator finishes inserting new bottles 214 into the housing 102.

At the start of a process cycle, the system 100 is empty of containers. A set of the containers is loaded into the mount assembly 212 aligned with the operator station 202. After a set period of time, the rotary assembly 210 rotates to advance the mount assemblies 212 by one station. In some embodiments, for example, bottles are loaded into the system on the mount assembly. The operator initiates the cycle start for the system. Bottle washing takes between 20 seconds and 45 seconds depending on the application (e.g., the size of the bottles, the requirements for washing). Bottle filling takes 12-16 seconds depending on line pressure and bottle size. All times can be controlled from the operator interface to ensure they meet both quality and regulatory requirements. Once sanitizing and filling are complete, the system automatically indexes the system by one station location, which takes between 4 and 6 seconds.

Figure 3A:
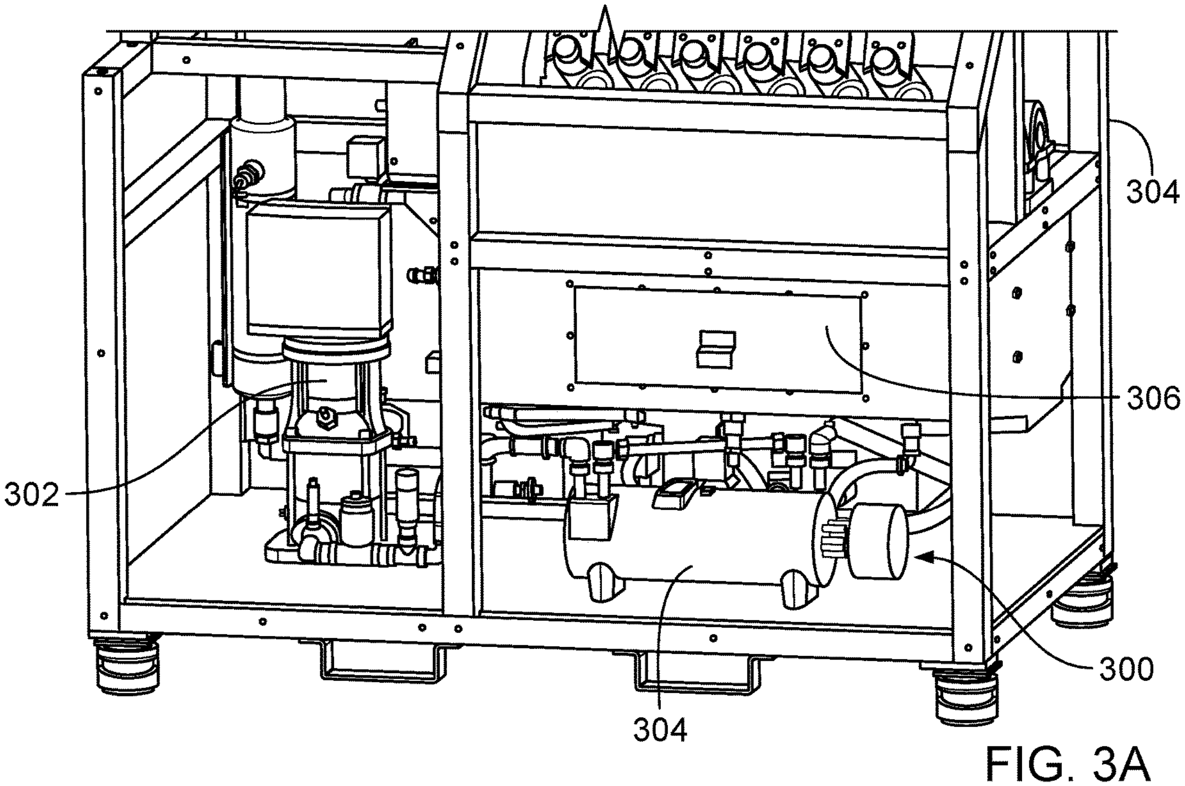
FIGS. 3A and 3B are perspective views of water heating systems.
Figure 3B:
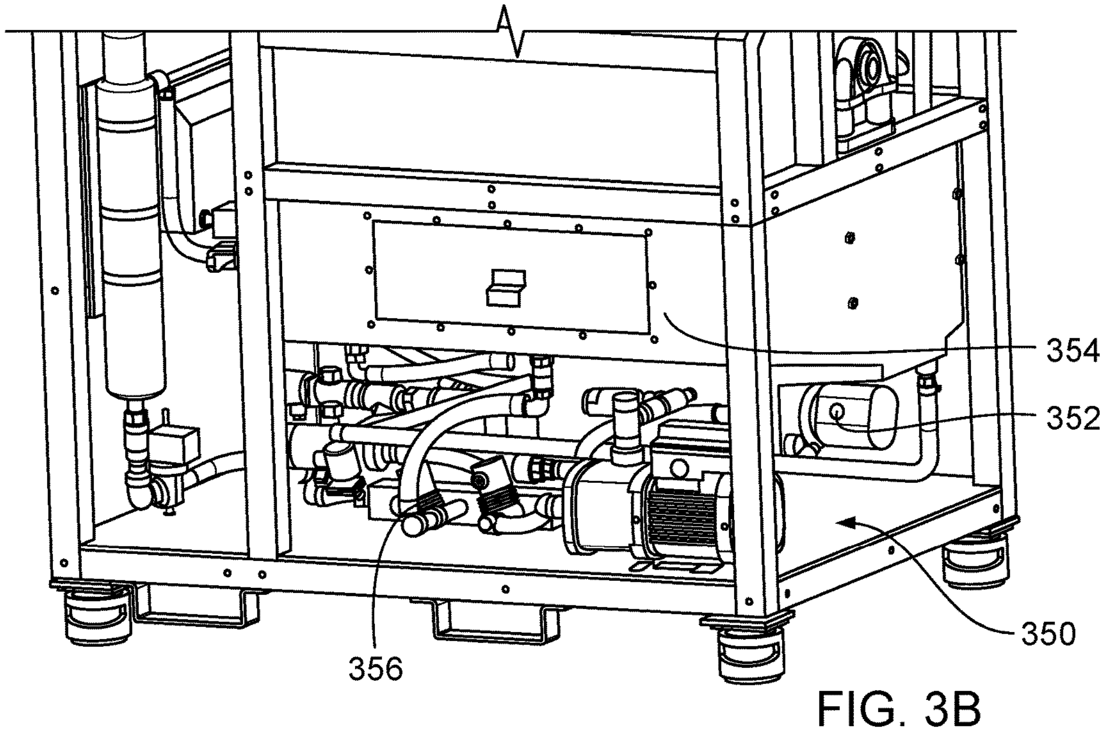

FIGS. 3A and 3B are perspective views of water heating systems.

FIG. 3A illustrates a water heater 300 installed in the system 100. The water heater 300 includes a circulation pump 302 operable to move water through a heating unit 304 and circulate it through a holding tank 306. The heater 300 can include a steel block manifold, which radiates heat, inside of the holding tank 306 to keep heat inside the process water and reduce heat loss.

FIG. 3B illustrates a different water heating system 350 installed in the system 100. The water heating system 350 has a number of advantages over conventional water heating systems and the water heater 300. The water heating system 350 has reduced heat loss, increased power efficiency, and easier manufacturability than conventional systems. To reduce the heat loss in the system, an immersion heater 352 is installed directly into the hot water holding tank 354. Recirculation of hot water during machine idling has a shorter path. The distribution manifold 356 can be manufactured a food grade plastic that has a lower thermal conductivity than the metal of water heater 300 to reduce heat loss during recirculation. Along with providing better thermal insulation, the manifold 356 can be installed outside of the water holding tank 354. By installing the manifold externally, manufacturing costs and times can be reduced. The external manifold 356 also allows for the removal of several ports otherwise required to be installed into the tank. Each removed port is a reduction of potential sources of leaks and failure in the water heating system.

Figure 4:
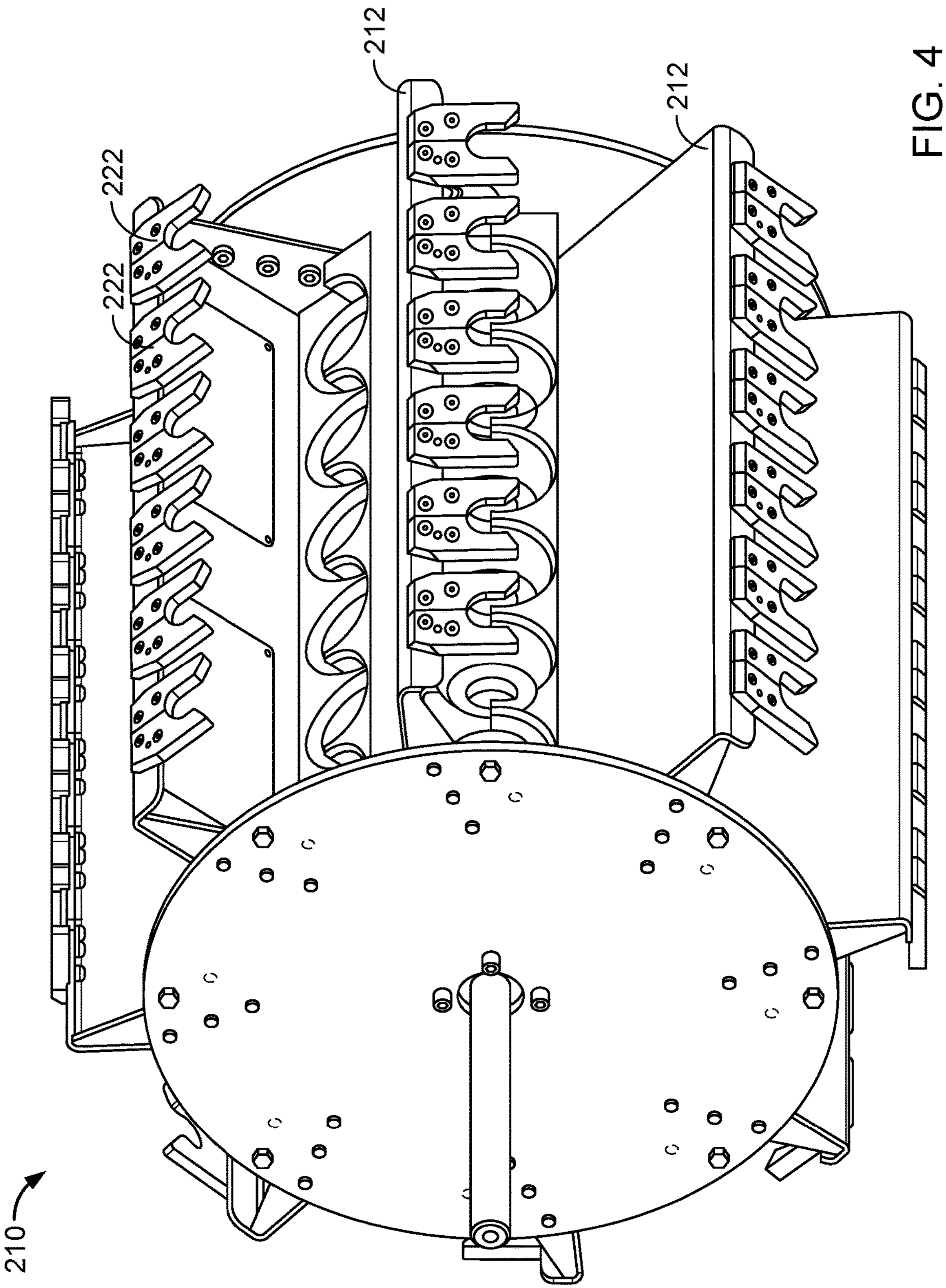
FIG. 4 is a perspective view of a rotary assembly for use within the apparatus of FIG. 1.

FIG. 4 is a perspective view of the rotary assembly 210. The rotary assembly 210 includes a plurality of mount assemblies 212. Each mount assembly 212 is configured to hold a set of bottles. The rotary assembly 210 is operable to rotate the plurality of mount assemblies 212 about a central axis of the rotary assembly 210. In the illustrated example, the rotary assembly 210 has eight mount assemblies 212, and each mount assembly 212 can hold a set of six bottles in six bottle mounts 222. In other embodiments, the rotary assembly 210 has different numbers of mount assemblies 212, and each mount assembly can hold different numbers of containers. In the rotary assembly 210 of FIG. 4, there are enough mount assemblies 212 to hold a set of bottles at each station of the system 100 (e.g., the operator station 202, washing station 204, filling station 206, capping station 208, steam injector 216, and cap dispenser 218).

Figure 5:
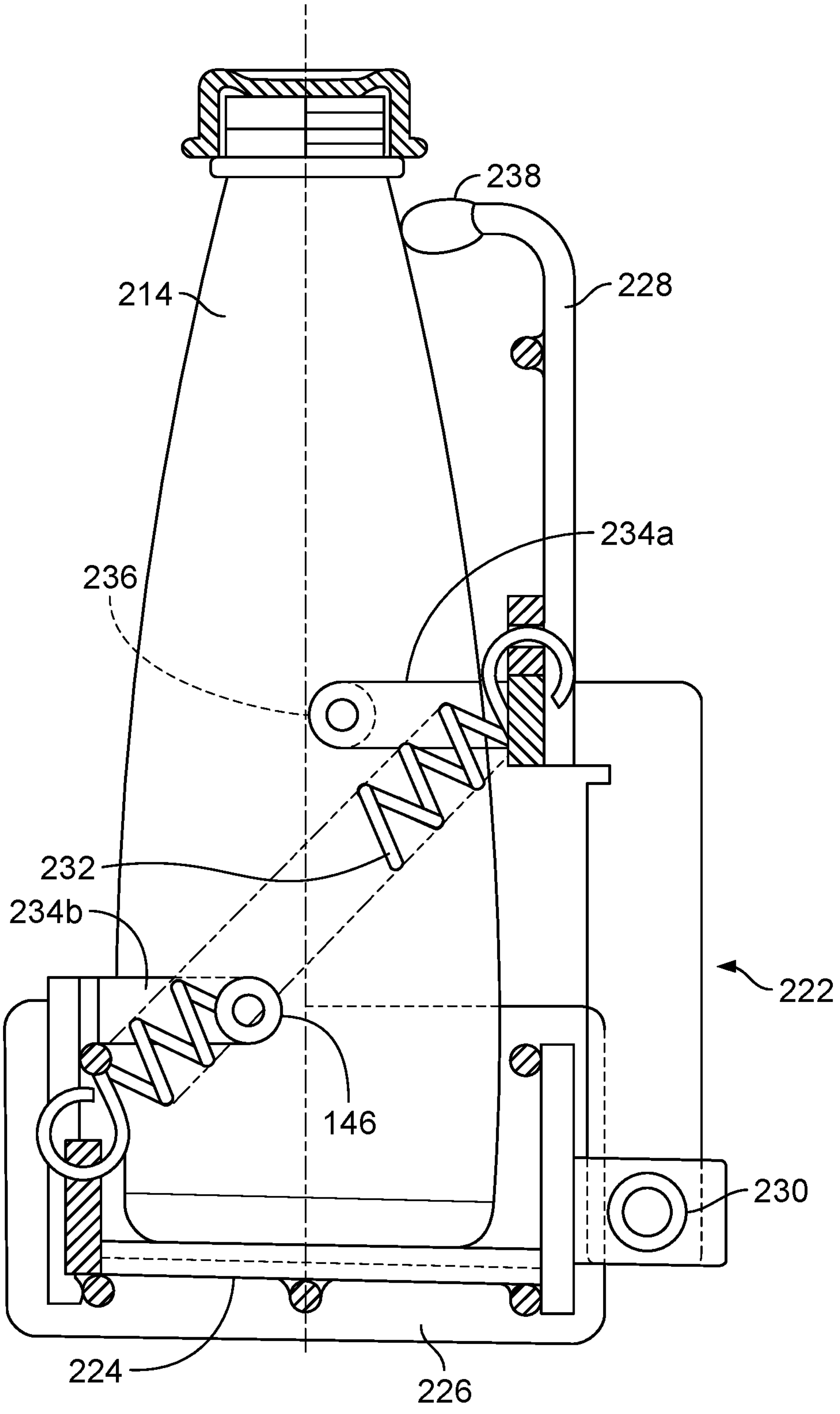
FIG. 5 is a side view of a mount holding a bottle.

FIG. 5 is a side view of one of the bottle mounts 222 of the rotary assembly 210 holding a bottle 214. The bottle mount 222 includes a frame structure 224 and opposing mounting brackets 226 for supporting the mount assembly. The brackets 226 are connected to the frame structure 224. A container engager 228 may be attached to the frame structure 224 with a rotatable hinge 230. A spring 232 is connected to the container engager 228 and the frame structure 224. The spring 232 biases that the container engager 228 towards a closed position, thus securing one of the bottles to the bottle mount 222. A cam, which in some embodiments is attached to the housing, is configured to place the container engager 228 in an open position by overcoming the force from the spring 232. The cam is positioned to place the container engager 228 in an open position when the bottle mount 222 is positioned at the operator station, allowing the containers to be placed in (or removed from) the bottle mount 222.

One or more members 234*a* and 234*b* may be secured to the frame structure 224 and/or the container engager 228. The members 234*a* and 234*b* form an opening for receiving a container 214. Grips 236 and 238 are attached to the members 234*a* and 234*b* and/or to the container engager 228 to help secure one or more containers 214 to the bottle mount 222.

Figure 6:
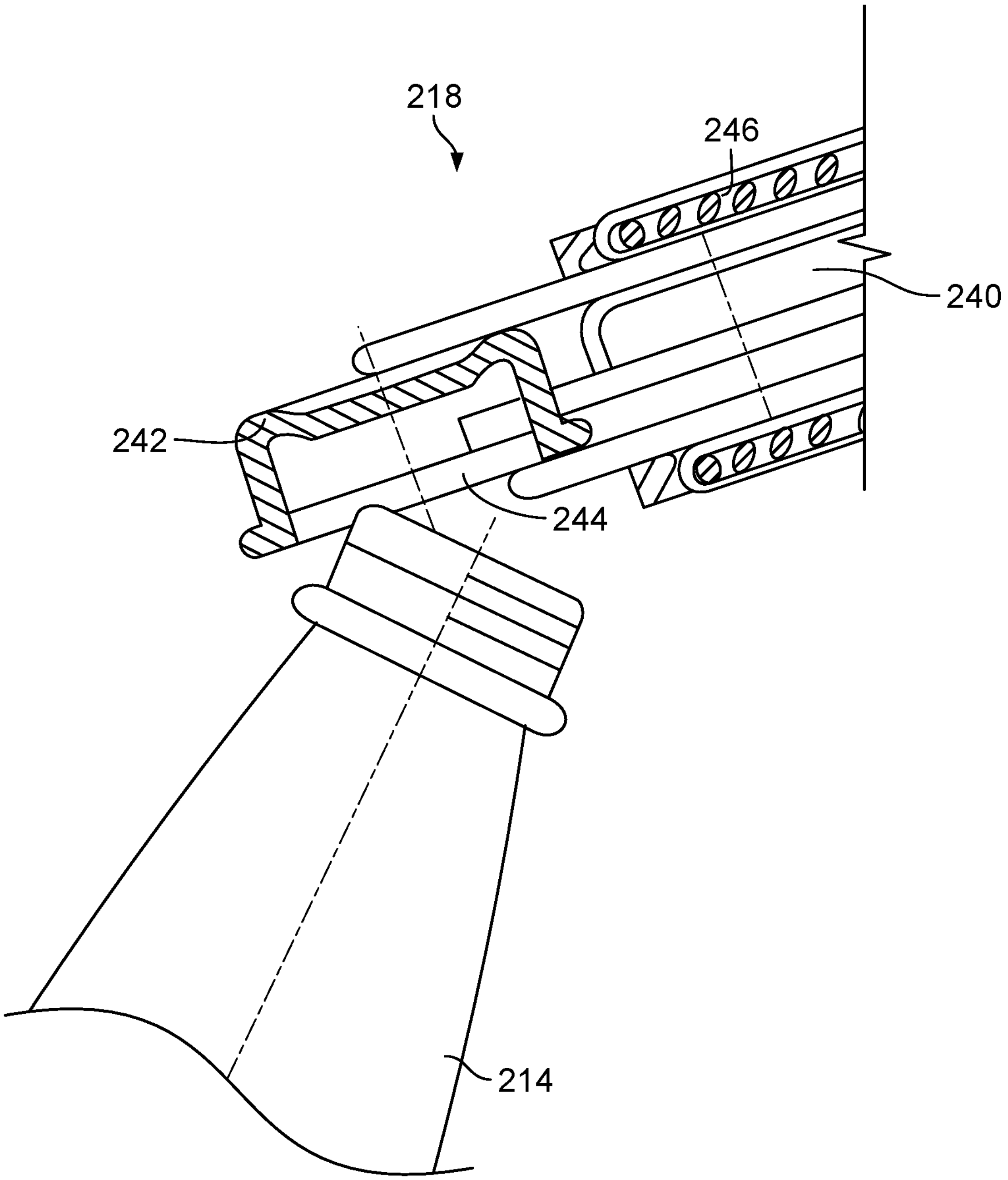
FIG. 6 illustrates a cap dispenser.

FIG. 6 illustrates the cap dispenser 218 in more detail. The cap dispenser 218 includes a sleeve 240, which holds multiple caps 242 and feeds one or more cap release devices 244. Each cap release device 244 dispenses a cap 242 and positions the cap 242 over the opening of a container 214. For example, the top of the container 214 can pull the cap 242 from the cap release device 244 as the container 214 is rotated past the cap release device 244. The cap sleeve 240 and/or the cap release device 244 may include a heating element 246 that heats the cap 242 to soften a material that forms at least a part of the cap 242 (e.g., plastisol which is a suspension of synthetic resin particles convertible by heat into solid plastic). For example, the cap 242 may have a metallic exterior portion and a plastic or rubber interior portion. The cap dispenser 218 may also include one or more dispensing devices (e.g., a cap sanitizing fluid dispenser) for cleaning the caps before they are placed on a container 214. For example, the dispensing device may spray water (e.g., heated water) and/or a sanitizer onto the caps 242. In some embodiments, the cap dispenser 218 works in conjunction with steam injector 216 to spray steam onto the caps 242. Additionally, the caps 242 may be sprayed with clean filtered water from a cap cleaning dispenser to remove any sanitizing fluid, which then drains to the bottom of the apparatus, e.g., along with water dispensed at the washing stations.

Figure 7A:
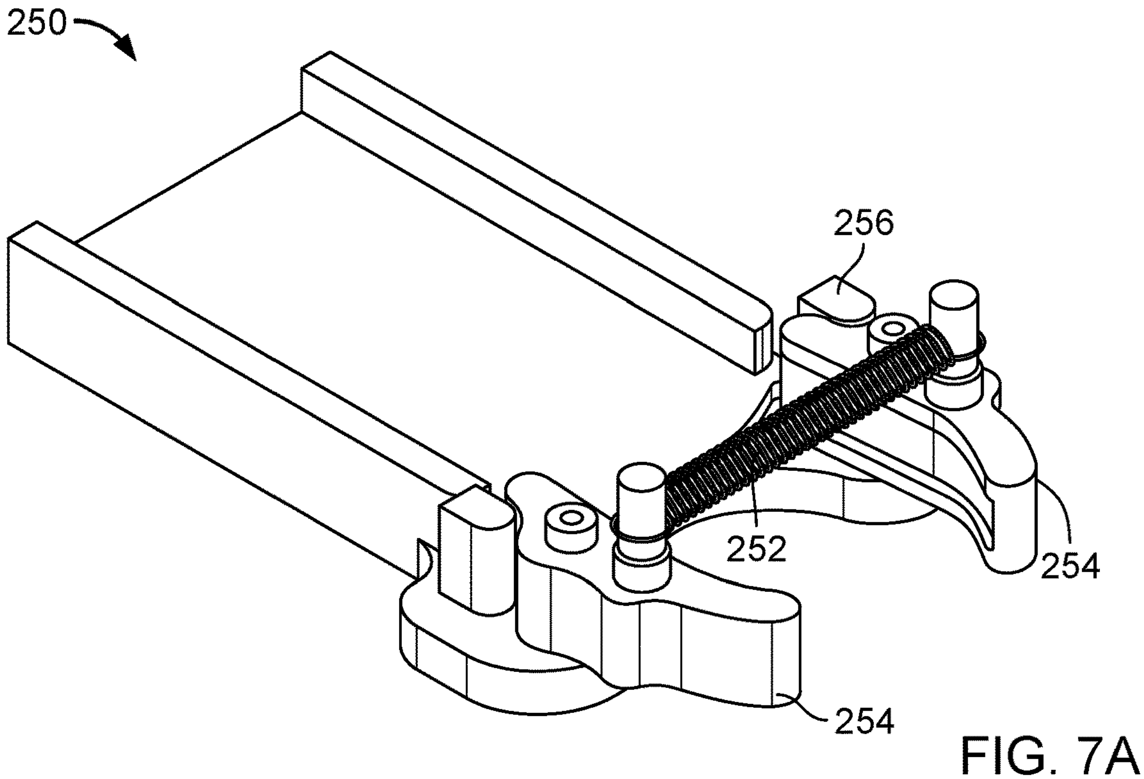
FIGS. 7A and 7B illustrate another cap dispenser.
Figure 7B:
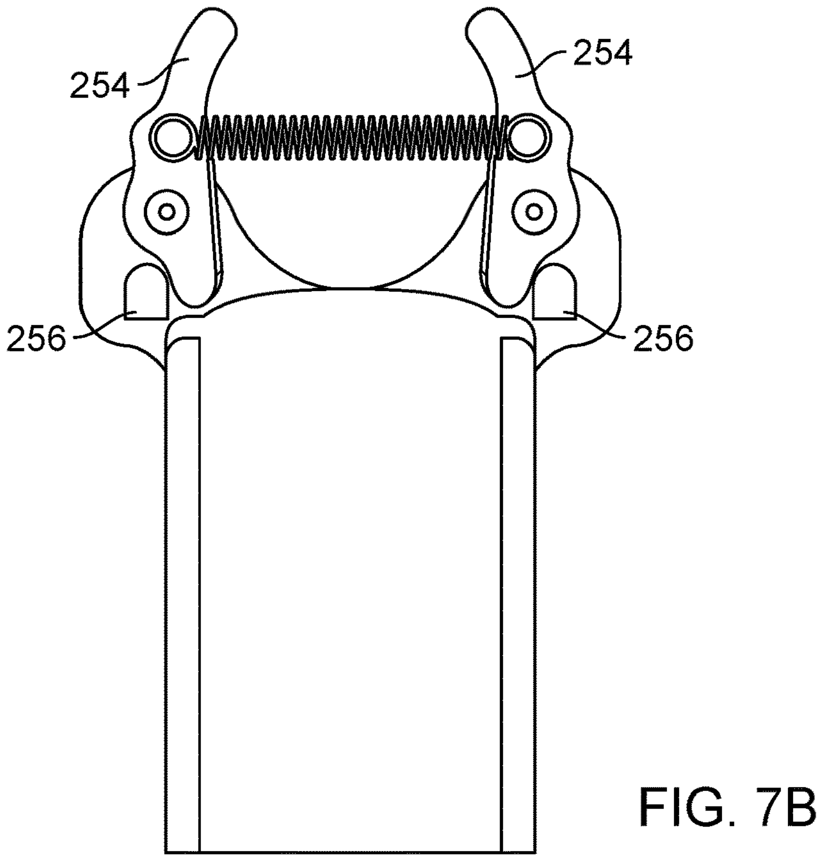

FIGS. 7A and 7B illustrate a different cap dispenser 250. The cap dispenser 250 includes two moving parts: a spring 252 and a set of arms 254. The cap dispenser 250 also includes rear stops 256. The set of arms 254 are joined to the feeding tray by a shoulder bolt which acts as a bearing for the set of arms 254 to pivot around. The spring 252 is used to maintain tension at the center of each arm 254. The spring 252 acts to hold caps in place when not being dispensed. The rear stops 256 set the position of the set of arms 254 and prevent the set of arms 254 from closing too tightly. For example, the rear stops 256 fit into a recess in the set of arms 254 which allows for a predetermined range of motion for the set of arms 254. The rear stops 256, along with constant tension from the spring 252, allow caps to slide easily to the end of the arms 254. Grooves can be machined into inside of the arms 254 to hold the rim of the caps.

An advantage of the cap dispenser 250 is the elimination of unintended cap ejection. When a cap is being pulled from the end of the dispenser 250, the short rear sides of the arms 254 pivot inward and prevent a new cap from entering the arms 254. Even if additional force is applied to caps trying to enter the arms 254 during the dispensing process, it only serves to secure the closed state of the system. Another added advantage of this dispenser 250 is the passive failure prevention caused by the geometry of the two arms 254. If the spring 252 was to fail during operation and a cap is removed from the system, the cap closes the arms 254 and prevents other caps from being ejected from the feeding tray leading to the dispenser. This is also a major failure mode identified during design and testing.

Figure 8A:
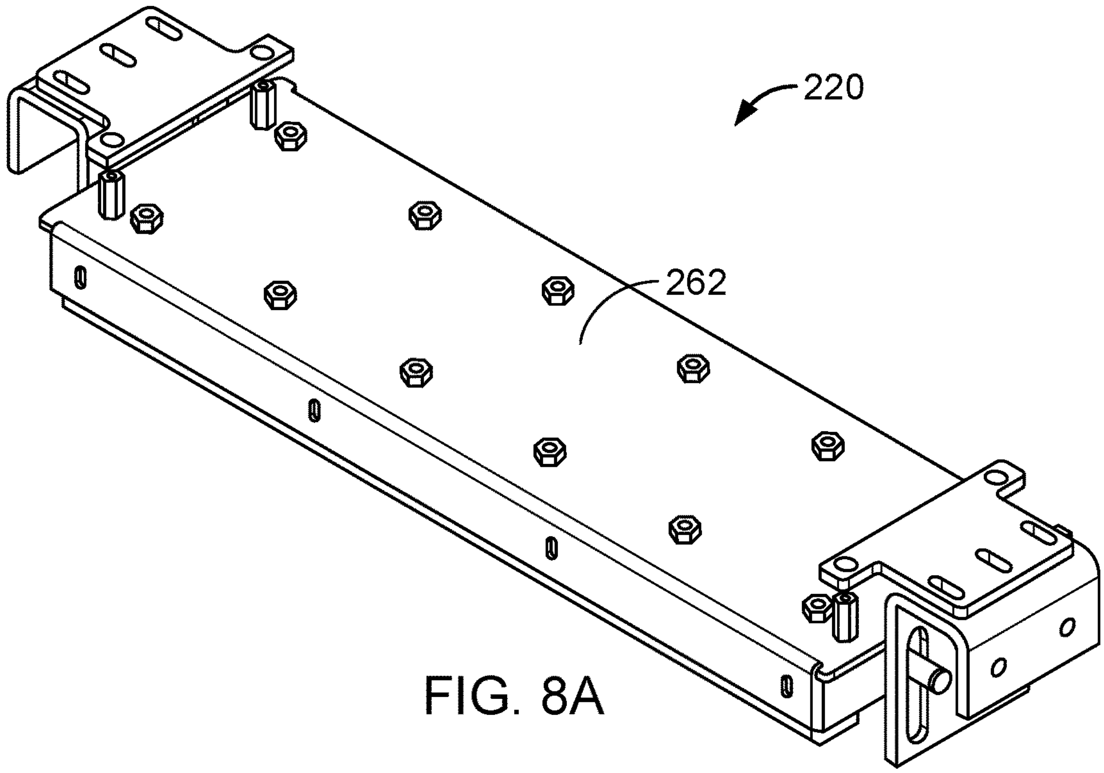
FIGS. 8A and 8B are perspective views of a cap setter.
Figure 8B:
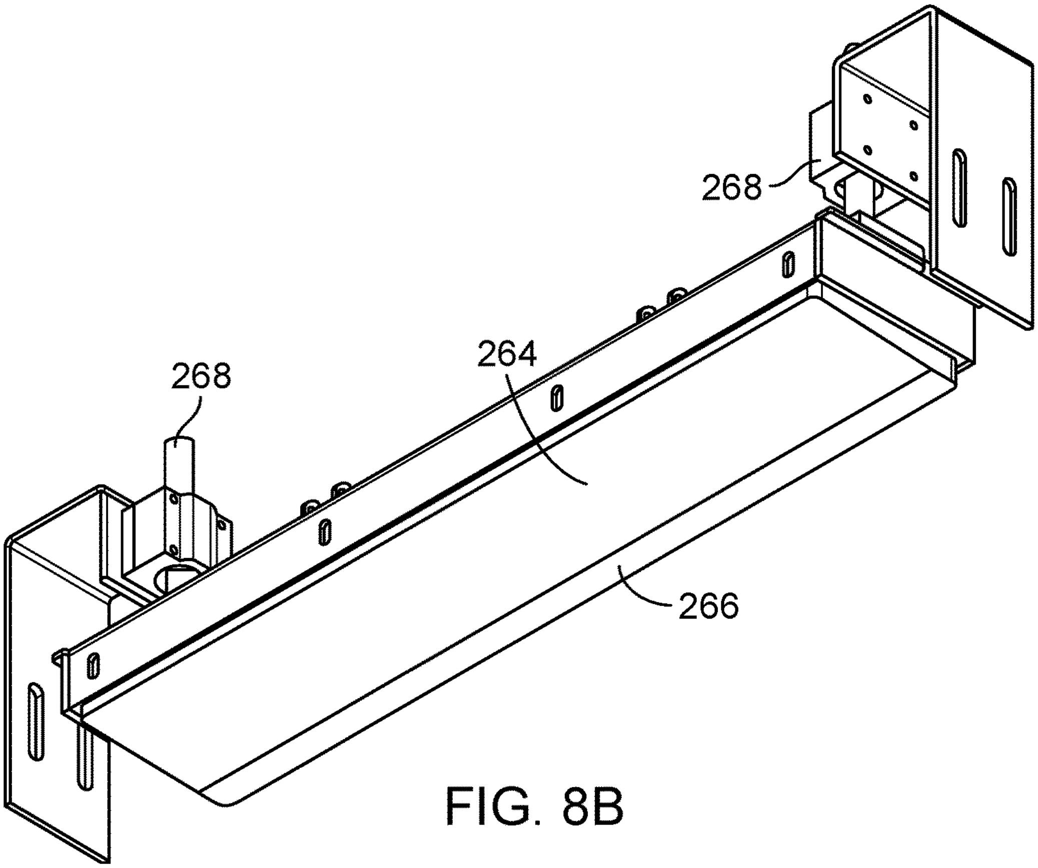

FIGS. 8A and 8B illustrate the cap setter 220. The cap setter 220 includes a bar 262 with an engagement surface 264 positioned to engage caps on a set of containers. When a set of capped containers is aligned with the engagement surface 264, the caps are pressed radially towards the containers by the engagement surface 264 which is stationary. The engagement surface 264 has a radius that is equal to the height of the containers being capped. For example, the bar 262 is in a fixed position relative to the apparatus (e.g., fixed to a housing of the apparatus), and the distance between the rotary assembly and the engagement surface 264 is constant. This design provides a constant, even pressure across the cap of the container, which reduces the likelihood that engagement between capped bottle and the cap setter causes uncapping of the container during rotation of the rotary assembly. For example, an engagement surface that does not have a radius equal to the rotary assembly (e.g., a flat engagement surface) can uncap the container due to uneven pressure across the cap of the container.

The cap setter 220 also includes an inclined edge 266 along one side of the bar 262. The inclined edge 266 provides an angled surface (e.g., a 5° angle, a 10° angle) relative to the radius of the engagement surface 264 for initially guiding and pressing caps downwards as the caps and containers enter the capping station. The inclined edge 266 also allows the cap setter 220 to engage caps that may be slightly misaligned or slightly elevated relative to the container (e.g., due to manufacturing tolerances).

The cap setter 220 includes actuators 268 (e.g., linear actuators) for changing the distance between the engagement surface 264 and the rotary assembly. These actuators are used to configure the system 100 for specific containers or bottles and as a safety feature. These actuators are not used to compress caps onto containers.

For example, the distance between the engagement surface 264 and the rotary assembly can be changed depending on the height of containers that are inserted into the apparatus. Additionally, the actuators 268 can change the distance between the engagement surface 264 and the rotary assembly to prevent two caps from being sealed to a container (e.g., double capping). For example, if a container already includes a sealed cap and is mistakenly run through the process a second time (e.g., if an operator did not remove the capped container and left the capped container in the apparatus to repeat the process) then the actuators 268 can prevent the cap setter 220 from engaging the capped container and connecting a second cap to the capped container. In an embodiment, the cap setter 220 includes a switch (e.g., a passive limit switch) that can detect whether a sealed cap and a second cap are present on a container. For example, the switch can include fingers, rollers, levers, or whiskers that touch the tops of a set of containers, and receive a number of signals representing whether each of the containers includes a cap, does not include a cap, or includes two caps (e.g., the finger can receive one signal for a container with a cap because the finger would feel only one surface, the finger can receive two signals for an uncapped container because the finger would feel two surfaces, and the finger can receive zero signals when a container is connected to two caps (i.e., double capped)). When the switch detects that two caps are present on a given container, the actuators 268 can be activated to increase the distance between the engagement surface 264 and the rotary assembly to prevent the engagement surface 264 from engaging the set of containers. In some embodiments, the apparatus can alarm when the actuators 268 activate.

Figure 9:
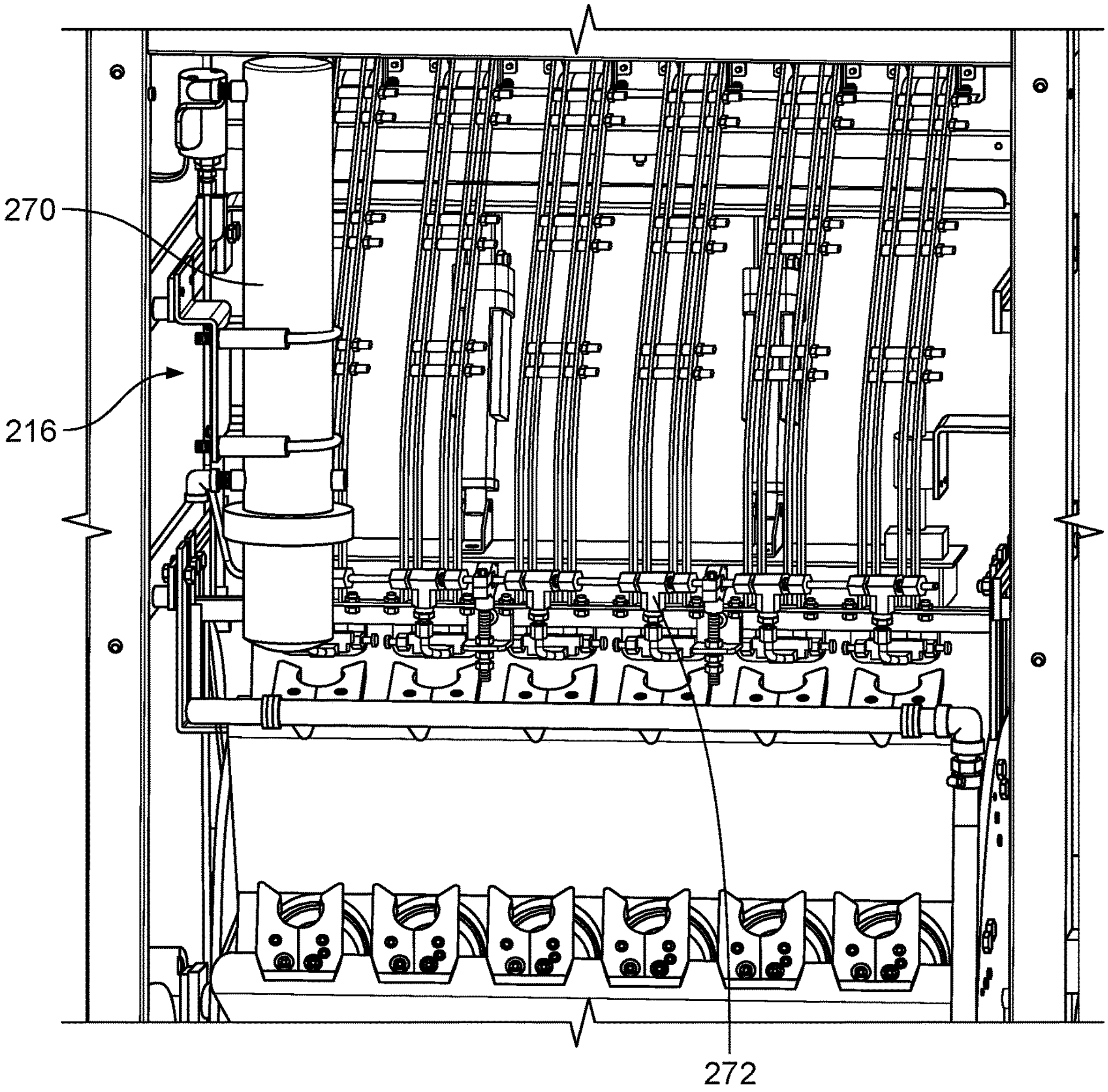
FIG. 9 is a perspective of a portion of the interior of the apparatus of FIG. 1 including a steam injector.

FIG. 9 is a perspective of a portion of the interior of the apparatus of FIG. 1 including the steam injector 216. The steam injector 216 includes an in-line steam generator 270 and discharge piping 272 coupled to the inline steam generator 270 to receive steam from the inline steam generator 270. The discharge piping 272 injects equal amounts of steam into each container of a set of the containers that align with the steam injector 216 during operation of the apparatus.

Figure 10:
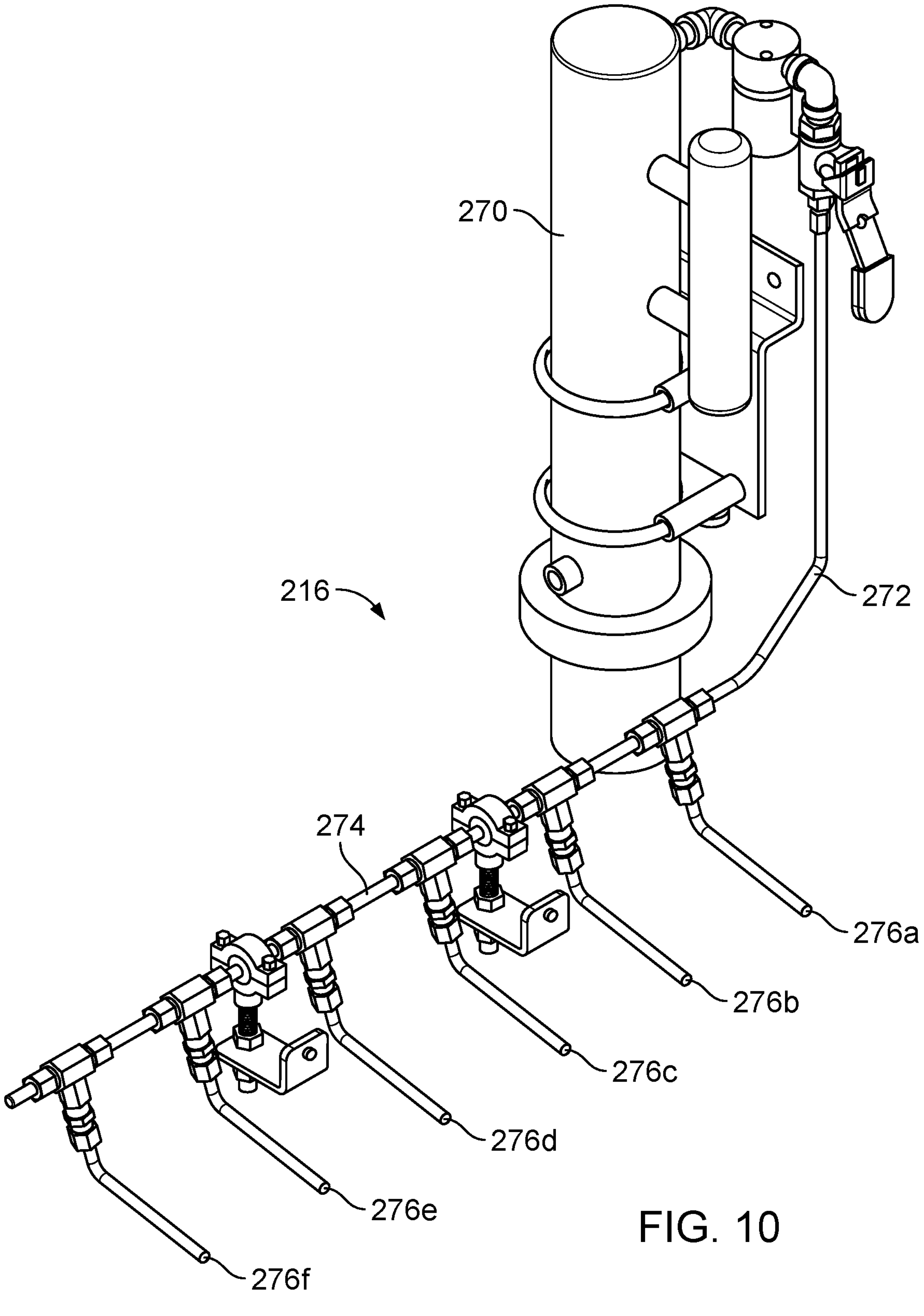
FIG. 10 is a perspective view of the steam injector.

FIG. 10 is a perspective view of the steam injector 216. The discharge piping 272 of the steam injector 216 includes a manifold 274 and a plurality of dispensing ports 276. The dispensing ports 276 can be, e.g., orifices or dispensing nozzles. The steam injector 216 injects equal amounts of steam into each container by providing an equal pressure drop across the plurality of dispensing ports 276*a*, 276*b*, 276*c*, 276*d*, 276*e*, 276*f*. The dispensing ports have different orifice diameters to provide an equal pressure drop across the plurality of dispensing ports. For example, the orifice diameter of the dispensing port 276*a* closest to the steam generator 270 is smaller than the orifice diameters of the other dispensing ports 276*b*, 276*c*, 276*d*, 276*e*, 276*f* and the orifice diameters of the other dispensing ports increase with distance from the inline steam generator 270. The orifice diameter of the dispensing port 276*a* is smaller than the orifice diameter of the dispensing port 276*b*, which is smaller than the orifice diameter of the dispensing port 276*c*, which is smaller than the orifice diameter of the dispensing port 276*d*, etc. The orifice diameters of the dispensing ports can increase directly or proportionally with distance from the inline steam generator 270.

In some embodiments, the manifold 274 of the steam injector 216 includes valves which can provide an equal pressure drop across the plurality of dispensing ports 276*a*, 276*b*, 276*c*, 276*d*, 276*e*, 276*f* Although this can increase manufacturing cost, adding valves can provide additional control the pressure drop across the plurality of dispensing ports. For example, as atmospheric pressure changes (e.g., at different altitudes), varying orifice diameters alone may not be sufficient to maintain an equal pressure drop across the plurality of dispensing ports. Therefore, additional valves along the manifold 274 or within each dispensing port can be adjusted to maintain an equal pressure drop. Not all steam injectors include these additional valves.

Figure 11A:
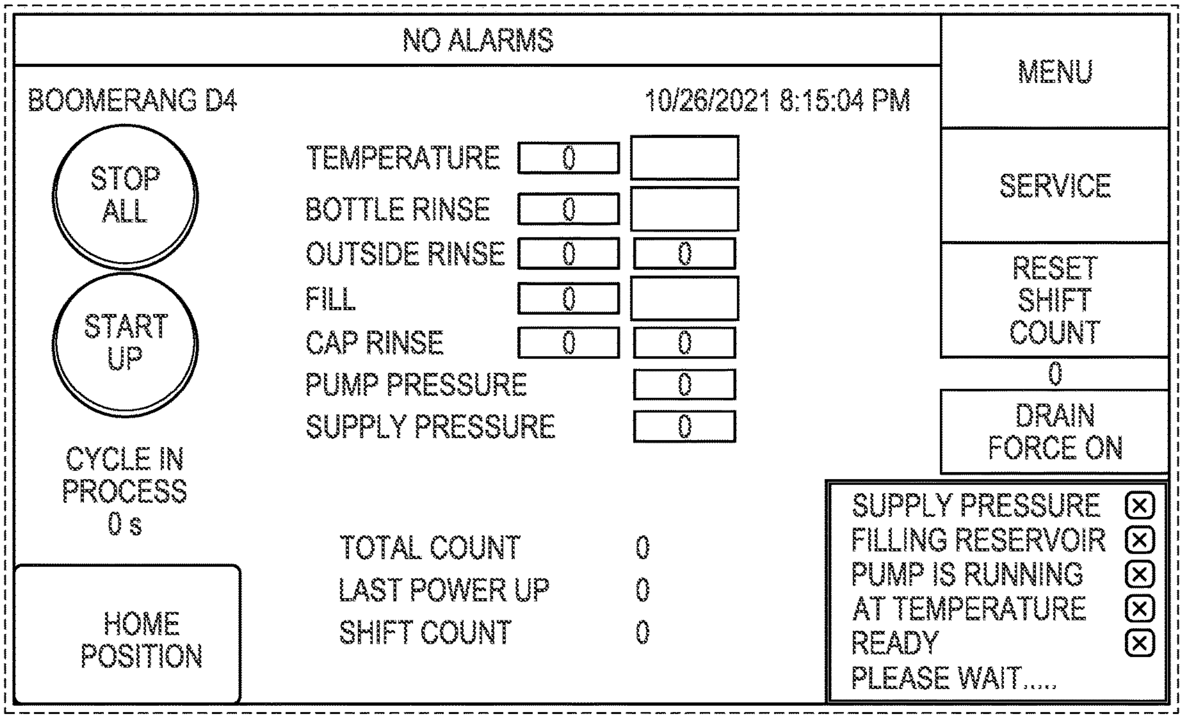
FIGS. 11A and 11B are illustrations of a user interface for the apparatus of FIG. 1.
Figure 11B:
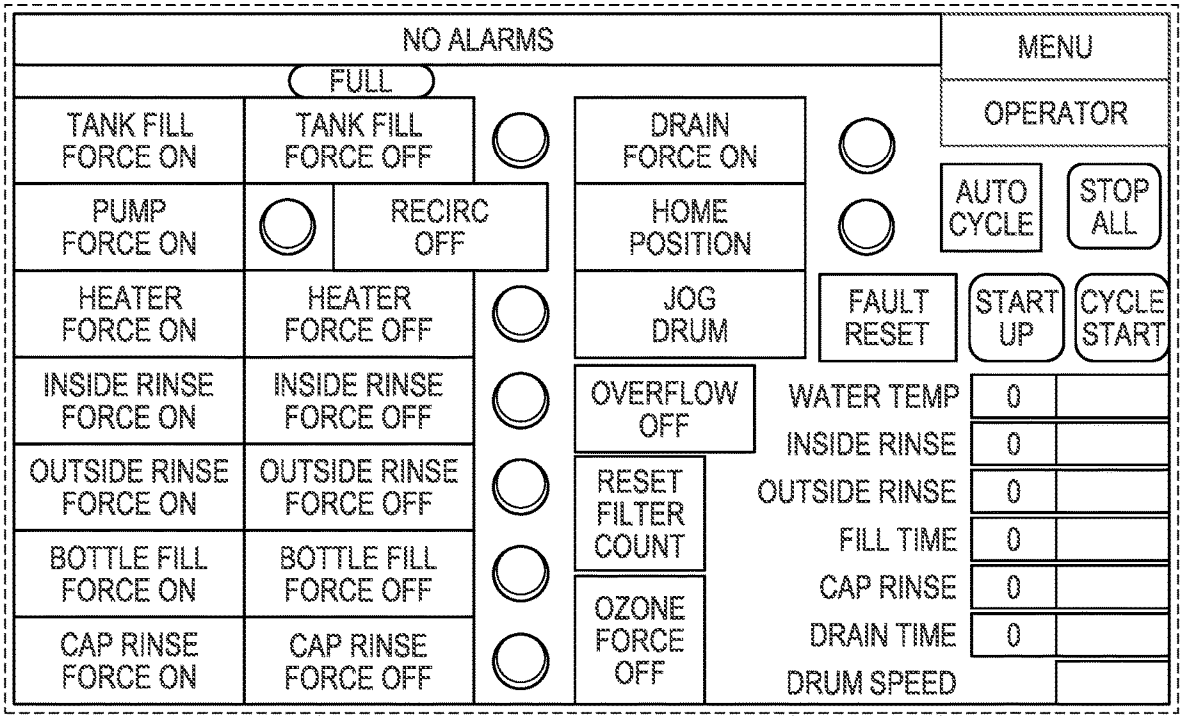

FIGS. 11A and 11B are illustrations of a user interface 106 of the system 100. Providing displays on the user interface 106 allows the user to access a variety of information concerning the status of the machine and filling cycle. It also allows for administrative access when performing maintenance and initial installation. The user interface also acts as a central access point for input/output operations of the electrical controls in the system. By consolidating the system response through the user interface, it allows for uniform control and presentation of system status to the user. The user interface can be split into two primary function groups: Operator and Service.

The operator screen depicted in FIG. 11A displays basic system data as well as providing startup and cycle start controls. It may or may not be password protected, and allows only for basic controls and observations. When using this screen, system temperature, process times, process counts, and alarm prompts can be accessed. For example, the count displays provide an operator with the number of cycles run on the system. The total count provides the operator the number of total cycles run on the machine after installation at the point of use. The shift count is designed to let operators track the daily usage of the machine. These and other metrics are utilized by the operator to determine operational efficiencies of the system and how to better schedule process shifts.

The service screen depicted in FIG. 11B provides for manual controls of all functions in the system 100. Typically this is password protected as it allows access to advanced controls. Discrete control of all actuators and stations can be available from this screen. Secondary startup and control methods may also be displayed on this screen. Cap setter actuator controls can also be contained on this screen and can allow a service technician to set the "home" position of the actuators (i.e., the resting position of the actuators) as well as to define fault conditions and responses. Full control of temperatures and times for the filling cycle can be set from this screen. Other services and controls can be provided to manually control functions of the system 100.

This specification describes devices, methods, and systems for cleaning, filling, and capping containers. It will be appreciated that various changes may be made by those skilled in the art without departing from the spirit and scope of this disclosure.

What is claimed is:

1. An apparatus for filling and sealing a container, the apparatus comprising:

a portable housing having an opening for receiving containers;

a rotary assembly disposed in the housing, the rotary assembly comprising a plurality of mount assemblies, each mount assembly configured to hold a set of the containers, the rotary assembly operable to rotate the plurality of mount assemblies about a central axis of the rotary assembly;

a washing station disposed in the housing;

a filling station disposed in the housing;

a steam injector disposed in the housing, the steam injector comprising:

an inline steam generator operable to heat water to steam; and discharge piping coupled to the inline steam generator to receive steam from the inline steam generator and configured to inject equal amounts of steam onto each cap of a set of caps as a set of containers of a mount assembly approaches or is aligned with the steam injector; and a capping station disposed in the housing, the capping station comprising a cap setter, the cap setter comprising a bar with an engagement surface positioned to engage caps on each container of the set of the containers of the mount assembly aligned with the steam injector such that each cap is pressed radially towards an associated container of the set of the containers of the mount assembly aligned with the steam injector.

2. The apparatus of claim 1, wherein the washing station comprises multiple washing stations disposed in the housing.

3. The apparatus of claim 1, wherein the distance between the engagement surface of the bar of the cap setter and the central axis of the rotary assembly is constant along the length of the engagement surface.

4. The apparatus of claim 3, wherein the bar is fixed in position relative to the central axis of the rotary assembly during operation of the apparatus.

5. The apparatus of claim 3, wherein the cap setter comprises linear actuators operable to adjust a distance of the bar from the central axis of the rotary assembly.

6. The apparatus of claim 5, wherein the linear actuators are connected to a switch that detects whether a detected container includes a sealed cap and a second cap, and the switch controls the linear actuators so that the linear actuators adjust the distance of the bar and prevent the engagement surface from engaging the caps when the switch detects that the detected container is connected to the detected cap.

7. The apparatus of claim 6, wherein the switch is a passive limit switch, and wherein the passive limit switch prevents double capping by detecting two signals when the detected container does not include the second cap or the sealed cap, one signal when the detected container includes a single cap, and zero signals when the detected container is connected to a sealed cap and a second cap.

8. The apparatus of claim 4, wherein the cap setter comprises an inclined edge along the bar.

9. A cap setter for capping a container, the cap setter comprising:

a bar with an engagement surface having a constant radius, the engagement surface positioned to engage caps on each container of a set of the containers such that the caps are pressed radially towards an associated container of the set of the containers;

wherein the cap setter comprises an inclined edge along the bar; and wherein the cap setter comprises linear actuators operable to adjust a distance of the bar from the central axis of the rotary assembly, wherein the linear actuators are connected to a passive limit switch that detects whether a detected container includes two caps and prevents double capping by detecting two signals when the detected container does not include any cap, one signal when the detected container includes a single cap, and zero signals when the detected container includes two caps, and the switch controls the linear actuators so that the linear actuators adjust the distance of the bar when the switch detects that the detected container includes two caps.

10. An apparatus for filling and sealing a container, the apparatus comprising:

a portable housing having an opening for receiving containers;

a rotary assembly disposed in the housing, the rotary assembly comprising a plurality of mount assemblies, each mount assembly configured to hold a set of the containers, the rotary assembly operable to rotate the plurality of mount assemblies about a central axis of the rotary assembly;

a washing station disposed in the housing;

a filling station disposed in the housing;

a steam injector disposed in the housing, the steam injector comprising:

an inline steam generator operable to heat water to steam; and discharge piping coupled to the inline steam generator to receive steam from the inline steam generator and configured to inject equal amounts of steam onto each cap of a set of caps as a set of containers of a mount assembly approaches or is aligned with the steam injector; and a capping station disposed in the housing, the capping station comprising a cap setter, the cap setter comprising a bar with an engagement surface positioned to engage caps on each container of the set of the containers of the mount assembly aligned with the steam injector such that each cap is pressed radially towards an associated container of the set of the containers of the mount assembly aligned with the steam injector; and a water heating system disposed in the housing, the water heating system comprising:

an immersion heater installed directly into a hot water holding tank, and a distribution manifold having a lower thermal conductivity than the water heater, the manifold being external to the hot water holding tank.

11. The apparatus of claim 10, further comprising a user interface on the exterior of the housing.

12. The apparatus of claim 11, wherein the user interface comprises a display that displays system data.

13. The apparatus of claim 12, wherein the system data comprises total cycles run on the machine after installation.

14. The apparatus of claim 11, wherein the user interface allows for individual control of each of the washing station, filling station, steam injector, capping station, and water heating system.

* * * * *